United States Patent
Hsieh et al.

(10) Patent No.: US 12,039,515 B2
(45) Date of Patent: Jul. 16, 2024

(54) MOBILE POS TERMINAL

(71) Applicant: Qisda Corporation, Taoyuan (TW)

(72) Inventors: Yung-Tsun Hsieh, Taipei (TW); Yu-Chen Liu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 275 days.

(21) Appl. No.: 17/723,624

(22) Filed: Apr. 19, 2022

(65) Prior Publication Data
US 2023/0252448 A1  Aug. 10, 2023

(30) Foreign Application Priority Data

Feb. 9, 2022 (CN) .......................... 202210120817.7
Feb. 9, 2022 (CN) .......................... 202220261685.5

(51) Int. Cl.
  *G06Q 20/32* (2012.01)
  *G06F 21/86* (2013.01)
  *G08B 21/18* (2006.01)

(52) U.S. Cl.
  CPC ......... *G06Q 20/3227* (2013.01); *G06F 21/86* (2013.01); *G08B 21/182* (2013.01)

(58) Field of Classification Search
  CPC .... G06Q 20/3227; G06F 21/86; G08B 21/182
  See application file for complete search history.

(56) References Cited

U.S. PATENT DOCUMENTS

| 9,971,454 | B2 * | 5/2018 | Doyle | H10K 59/40 |
| 10,481,748 | B2 * | 11/2019 | Zhu | G02F 1/1339 |
| 10,504,096 | B1 * | 12/2019 | Hafemann | G06F 21/86 |
| 2016/0313503 | A1 * | 10/2016 | Takemura | H05K 1/0306 |
| 2017/0339270 | A1 * | 11/2017 | Ashili | H04W 4/023 |
| 2018/0039362 | A1 * | 2/2018 | Liu | H10K 59/40 |
| 2018/0316815 | A1 * | 11/2018 | Douthat | G06Q 20/209 |

FOREIGN PATENT DOCUMENTS

WO  0163994 A2  8/2001

* cited by examiner

*Primary Examiner* — Mohamed Barakat

(57) ABSTRACT

A mobile POS terminal includes an enclosure, a POS system, a touch display panel, a sealant, and at least two temperature sensors. The POS system is disposed in the enclosure. The touch display panel is disposed on the enclosure. The sealant is disposed between the touch display panel and the enclosure. The sealant attaches the touch display panel to the enclosure. The at least two temperature sensors are disposed at at least two corners of the enclosure and under the touch display panel. A tamper warning is generated according to detecting results of the temperature sensors.

9 Claims, 4 Drawing Sheets

MOBILE POS TERMINAL

This application claims the benefit of People's Republic of China application Serial No. 202210120817.7, filed on Feb. 9, 2022, and People's Republic of China application Serial No 202220261685.5, filed on Feb. 9, 2022, the disclosure of which is incorporated by reference herein in its entirety.

TECHNICAL FIELD

The disclosure relates to a mobile POS (point-of-sale) terminal, and more particularly to mobile POS terminal including temperature sensors.

BACKGROUND

Nowadays, safety mechanism for mobile POS terminals is achieved using conductive components, such as carbon particles, zebra stripe, or the like. Generally, one end of a conductive component is disposed against a contact of the soft board under the touch display panel, and the other end is disposed against a contact of main circuit board. As such, a current path can be formed, and a detecting signal can be transferred. Once the touch display panel is disassembled and lifted, the compression force provided to the conductive component is not enough. This results in poor or even no contact, and thus the safety mechanism will be triggered, and a tamper warning will be generated. However, the touch display panel is constantly subjected to an upward force from the conductive component. Since the touch display panel is attached to the enclosure typically by a sealant, the touch display panel may be raised, and this may cause an appearance problem. In addition, the compression force provided to the conductive component may be decreased due to the raising of the touch display panel, and thus a line hit may be easier to occur when vibration happens, and the safety mechanism may be triggered by mistake. Generally, a higher contact force provides a more stable signal transfer, while the touch display panel will easily be lifted if the sealant fails to attach the touch display panel firmly. A smaller contact force may lead to a line hit during a drop and deformation process or under a vibration environment.

SUMMARY

This disclosure provides a new safety mechanism for mobile POS terminals without the conventional conductive components. As such, the problem described above can be effectively prevented.

In this disclosure, a mobile POS terminal is provided. The mobile POS terminal comprises an enclosure, a POS system, a touch display panel, a sealant, and at least two temperature sensors. The POS system is disposed in the enclosure. The touch display panel is disposed on the enclosure. The sealant is disposed between the touch display panel and the enclosure. The sealant attaches the touch display panel to the enclosure. The at least two temperature sensors are disposed at at least two corners of the enclosure and under the touch display panel. A tamper warning is generated according to detecting results of the temperature sensors.

Figure 1:
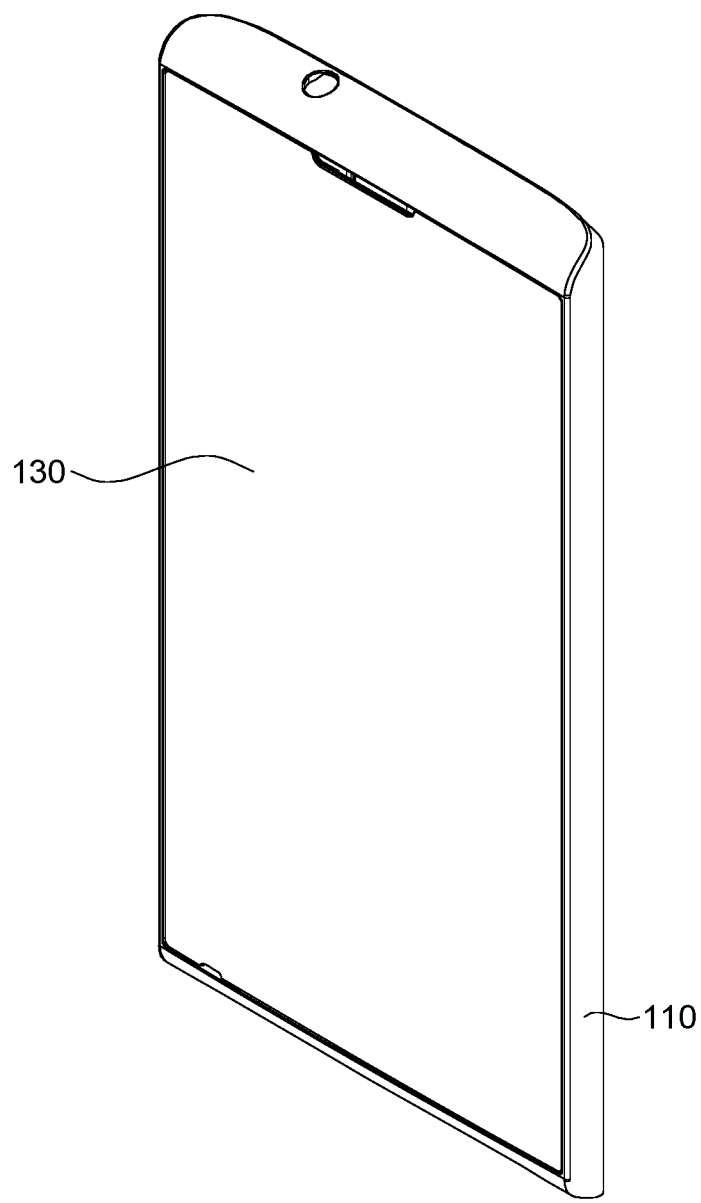
FIG. 1 shows an exemplary mobile POS terminal.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Various embodiments will be described more fully hereinafter with reference to accompanying drawings. The description herein and the accompanying drawings are provided for illustrative only, and not intended to result in a limitation. For clarity, the components may not be drawn to scale. In addition, some components and/or reference numerals may be omitted from some drawings. It is contemplated that the elements and features of one embodiment can be beneficially incorporated in another embodiment without further recitation.

Figure 2:
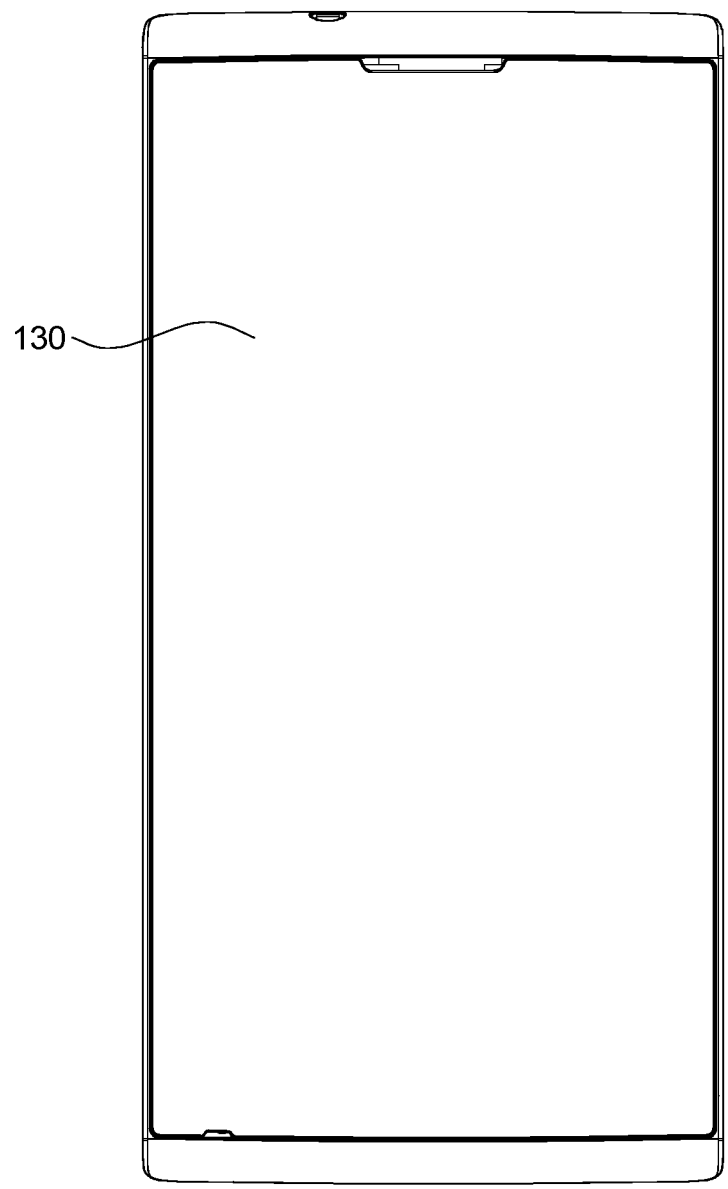
FIG. 2 shows an exemplary top view of the mobile POS terminal.
Figure 3:
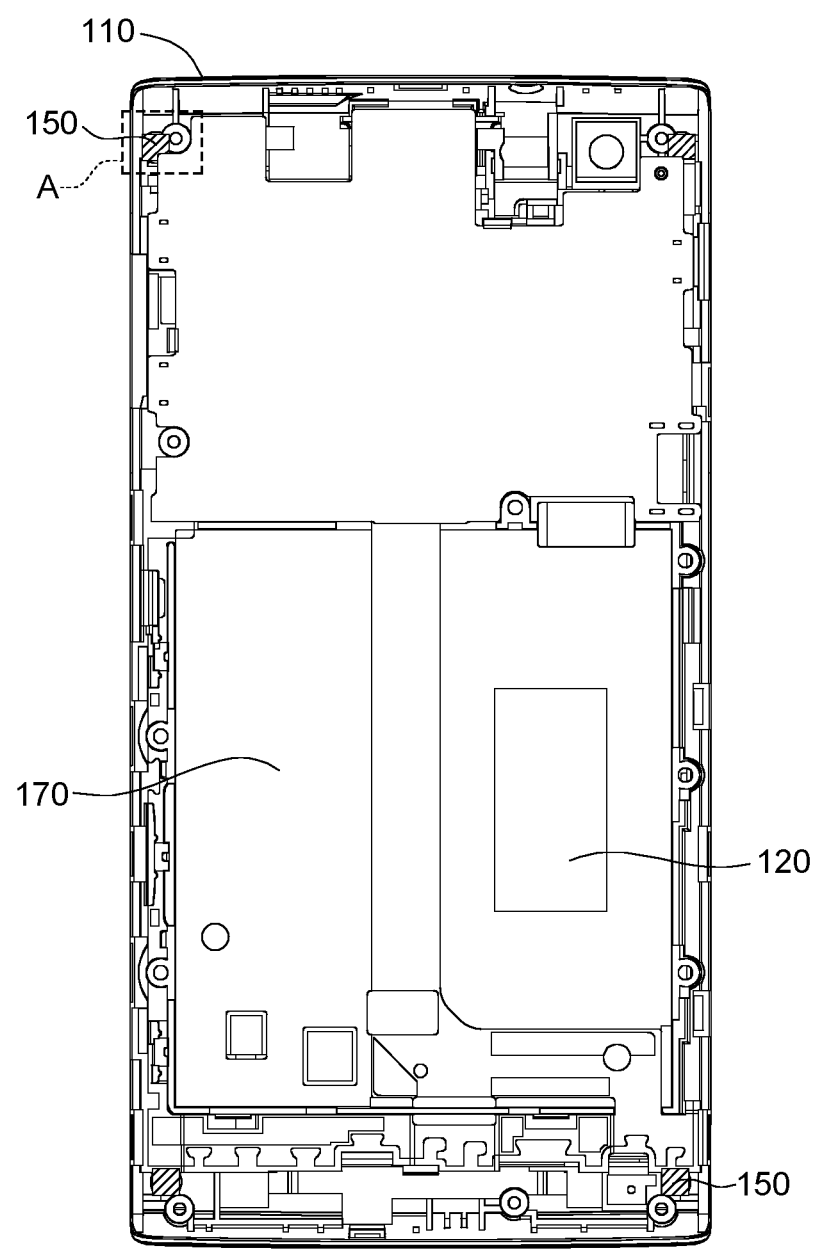
FIG. 3 shows an exemplary top view of the mobile POS terminal from which the touch display panel is removed.
Figure 4:
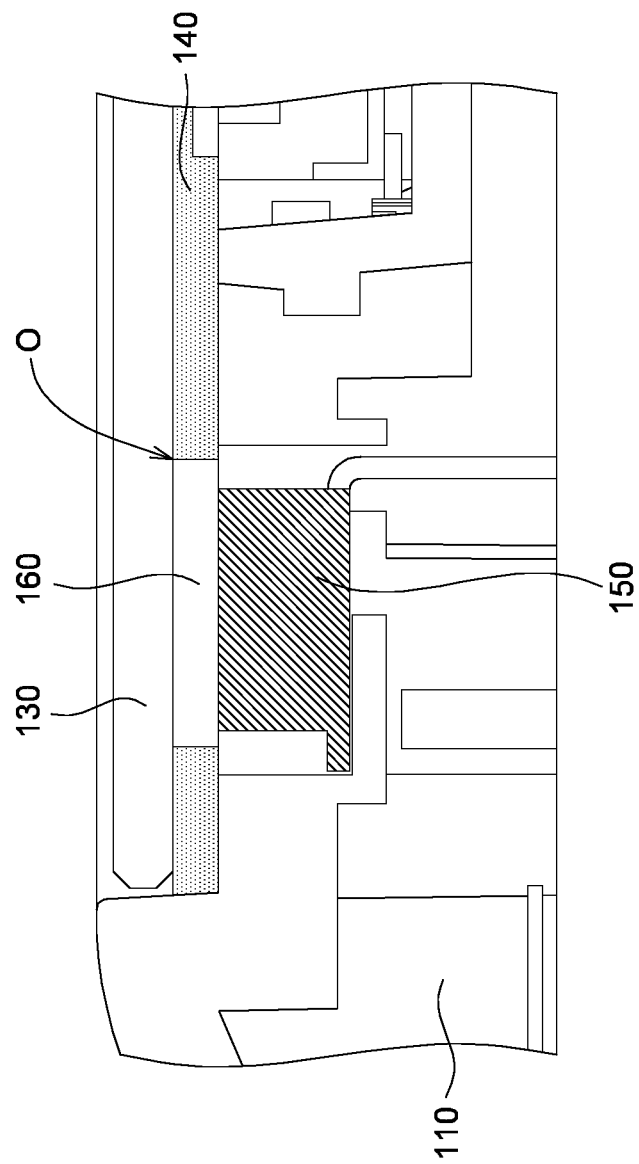
FIG. 4 shows an exemplary cross sectional view of a region in which a temperature sensor is disposed.

Referring to FIGS. 1-4, an exemplary mobile POS terminal 10 is shown. FIG. 1 is a perspective view of the mobile POS terminal 10. FIG. 2 is a top view of the mobile POS terminal 10. FIG. 3 is a top view of the mobile POS terminal 10 from which a touch display panel 130 is removed. FIG. 4 is an exemplary cross sectional view of a region A in which a temperature sensor 150 is disposed.

The mobile POS terminal 10 comprises an enclosure 110, a POS system 120, a touch display panel 130, a sealant 140, and at least two temperature sensors 150. The POS system 120 is disposed in the enclosure 110. The touch display panel 130 is disposed on the enclosure 110. The sealant 140 is disposed between the touch display panel and the enclosure 110. The sealant 140 attaches the touch display panel 130 to the enclosure 110. The at least two temperature sensors 150 are disposed at at least two corners of the enclosure 110 and under the touch display panel 130.

A tamper warning is generated according to detecting results of the temperature sensors 150. According to some embodiments, the tamper warning is generated if a detecting temperature difference of any two of the temperature sensors 150 is over a predetermined value. In some embodiments, the value may be 15. For example, when a temperature detected by one of the temperature sensors 150 is T (Celsius degree are used herein for T, T1, T2, and the like), and a temperature detected by another one of the temperature sensors 150 is larger than T+15° C., a tamper warning may be generated. According to some embodiments, the tamper warning is generated if a detecting temperature of any one of the temperature sensors 150 is beyond a predetermined temperature range. In some embodiments, the mobile POS terminal 10 is designed for use and storage at a temperature of T1 to T2, and the predetermined temperature range for the temperature sensors 150 may be defined as (T1*110%) to (T2*110%). For example, T1 may be −20° C., and T2 may be 60° C., but the disclosure is not limited thereto. In some embodiments, the mobile POS terminal 10 is designed for use and storage at a temperature of T1 to T2, and the predetermined temperature range for the temperature sensors 150 may be defined as (T1−15° C.) to (T2+15° C.). It can be appreciated that the various embodiments provided herein for the trigger of the tamper warning can be applied individually or in any possible combination as needed.

According to some embodiments, the mobile POS terminal 10 may further comprise at least two thermal conductive materials 160 each disposed between the touch display panel 130 and corresponding one of the temperature sensors 150. For example, the sealant 140 may have openings O corresponding to the temperature sensors 150, and the thermal conductive materials 160 can be disposed in the openings O. The thermal conductive materials 160 may be thermal pads, thermal greases, or the like, but the disclosure is not limited thereto. The mobile POS terminal 10 comprises at least two temperature sensors 150 disposed at at least two corners of the enclosure 110. When a number of the temperature sensors 150 is 2, 3, or 4, all of the temperature sensors 150 are disposed at different corners of the enclosure 110. However, it can be appreciated that the mobile POS terminal may also comprise a temperature sensor 150 not disposed in the corners. According to some embodiments, the temperature sensors 150 may be NTC sensors, thermistors, or the like, but the disclosure is not limited thereto. According to some embodiments, the temperature sensors 150 may be electrically connected to a circuit board 170 of the mobile POS terminal 10, which is also disposed in the enclosure 110. In some embodiments, the electric connection is achieved by wires, a flexible printed circuit board, or the like. In some embodiments, some or all of the temperature sensors 150 may be disposed directly on the circuit board 170.

Since it is hard to disassemble or lift the touch display panel merely be force at room temperature without damage of other components, heating or quenching typically is needed for reducing adhesiveness of the sealant. As such, detect a change through the temperature sensors can be an effective safety mechanism for preventing the disassembly or lifting. While the description above is focused on the disassembly or lifting of the touch display panel, disassembly or lifting of other components may also be detected using a temperature sensor in a similar way. The safety mechanism provided herein using the temperature sensors is easy to implement. In addition, when temperature sensors are used for safety mechanism according to the embodiments, the touch display panel is not forced as in the conditions with the conventional conductive components, and thus the reliability problem of attachment can be prevented.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A mobile POS (point-of-sale) terminal, comprising:
an enclosure;
a POS system disposed in the enclosure;
a touch display panel disposed on the enclosure;
a sealant disposed between the touch display panel and the enclosure, the sealant attaching the touch display panel to the enclosure; and
at least two temperature sensors disposed on at least two corners of the enclosure and under the touch display panel;
wherein a tamper warning is generated according to detecting results of the temperature sensors.

2. The mobile POS terminal according to claim 1, wherein the tamper warning is generated if detecting temperature difference of any one of the temperature sensors is over a predetermined value.

3. The mobile POS terminal according to claim 2, wherein the value is 15.

4. The mobile POS terminal according to claim 1, wherein the tamper warning is generated if detecting temperature of any one of the temperature sensors is beyond a predetermined temperature range.

5. The mobile POS terminal according to claim 4, wherein the mobile POS terminal is designed for use and storage at a temperature of T1 to T2, and the predetermined temperature range for the temperature sensors is defined as (T1*110%) to (T2*110%).

6. The mobile POS terminal according to claim 4, wherein the mobile POS terminal is designed for use and storage at a temperature of T1 to T2, and the predetermined temperature range for the temperature sensors is defined as (T1−15° C.) to (T2+15° C.).

7. The mobile POS terminal according to claim 1, further comprising:
at least two thermal conductive materials each disposed between the touch display panel and corresponding one of the temperature sensors.

8. The mobile POS terminal according to claim 1, wherein the sealant has openings corresponding to the temperature sensors.

9. The mobile POS terminal according to claim 1, wherein when a number of the temperature sensors is 2, 3, or 4, all of the temperature sensors are disposed at different corners of the enclosure.

* * * * *